(12) United States Patent
Meixner et al.

(10) Patent No.: US 6,474,685 B1
(45) Date of Patent: Nov. 5, 2002

(54) GAS GENERATOR

(75) Inventors: Rudolf Meixner, Ampfing (DE);
Werner Müller, Mühldorf/Inn (DE);
Herbert Ragner, Furth (DE)

(73) Assignee: TRW Airbag Systems GmbH & Co. KG, Inn (DE)

( * ) Notice: Subject to any disclaimer, the term of this patent is extended or adjusted under 35 U.S.C. 154(b) by 0 days.

(21) Appl. No.: 09/544,408

(22) Filed: Apr. 6, 2000

(30) Foreign Application Priority Data

Apr. 6, 1999 (DE) .......................... 299 06 173

(51) Int. Cl.⁷ .............................................. B60R 21/26
(52) U.S. Cl. ..................... 280/741; 280/736; 280/742
(58) Field of Search .......................... 280/736, 741, 280/742, 737, 738, 740; 222/5

(56) References Cited

U.S. PATENT DOCUMENTS

| | | | | |
|---|---|---|---|---|
| 3,966,226 A | * | 6/1976 | Roth .......................... 280/737 |
| 5,219,178 A | | 6/1993 | Kobari et al. | |
| 5,226,561 A | * | 7/1993 | Hamilton et al. ........... 280/737 |
| 5,462,307 A | * | 10/1995 | Webber et al. ............. 280/737 |
| 5,553,889 A | * | 9/1996 | Hamilton et al. ........... 280/736 |
| 5,573,271 A | * | 11/1996 | Headley ..................... 280/741 |
| 5,611,566 A | | 3/1997 | Simon et al. | |
| 5,660,412 A | * | 8/1997 | Renfroe et al. ............. 280/737 |
| 5,700,030 A | * | 12/1997 | Goetz ......................... 280/736 |
| 5,806,888 A | * | 9/1998 | Adamini ..................... 280/741 |
| 5,820,162 A | * | 10/1998 | Fink ........................... 280/742 |
| 5,979,936 A | * | 11/1999 | Moore et al. ............... 280/736 |
| 6,039,347 A | * | 5/2000 | Maynard ..................... 280/736 |
| 6,065,774 A | * | 5/2000 | Cabrera ....................... 280/741 |
| 6,095,556 A | * | 8/2000 | Bailey et al. ................ 280/737 |
| 6,168,202 B1 | * | 1/2001 | Stevens ....................... 280/737 |
| 6,189,925 B1 | * | 2/2001 | Reichtalhammer et al. . 280/736 |
| 6,196,582 B1 | * | 3/2001 | Sparkman et al. .......... 280/736 |
| 6,196,583 B1 | * | 3/2001 | Ruckdeschel et al. ...... 280/736 |
| 6,234,523 B1 | * | 5/2001 | Tokoro et al. .............. 280/737 |
| 6,237,498 B1 | | 5/2001 | Winterhalder et al. | |

FOREIGN PATENT DOCUMENTS

| | | |
|---|---|---|
| DE | 19515980 | 11/1995 |
| DE | 19600843 | 1/1997 |
| DE | 19611102 | 9/1997 |
| EP | 0888935 A1 | 1/1999 |
| WO | 9741007 | 4/1997 |

* cited by examiner

Primary Examiner—Brian L. Johnson
Assistant Examiner—Hau Phan
(74) Attorney, Agent, or Firm—Tarolli, Sundheim, Covell, Tummino & Szabo L.L.P.

(57) ABSTRACT

A gas generator for a vehicle occupant restraint system. The gas generator comprises a housing, a filter chamber, and a combustion chamber which is filled with solid propellant and which has an outflow end. The gas generator further comprises at least one igniter unit which has an igniter and ignites the solid propellant, and comprises at least one filter which adjoins the solid propellant at the outflow end and delimits the combustion chamber. The filter has a central part which at least in sections has the shape of a cone and tapers in a direction towards an interior of the combustion chamber. The solid propellant laterally adjoins the conical section.

13 Claims, 6 Drawing Sheets

GAS GENERATOR

TECHNICAL FIELD

The invention relates to a gas generator, in particular for a vehicle occupant restraint system.

BACKGROUND OF THE INVENTION

A gas generator known from the WO 97/41007 has a filter disc and a combustion chamber filter arranged upstream of a wall which delimits the filter chamber. The filter disc is constructed elastically, in order to hold the solid propellant, provided in tablet form, securely in place in the combustion chamber.

In the case of very long combustion chambers, in particular in combustion chambers in so-called tubular gas generators in which the gas generator has an elongated cylindrical housing, non-reproducible and too high combustion chamber pressures may occur. Furthermore, the filter units were acted upon too intensively with particles which arise on combustion of the propellant. For this reason, the filters became partially clogged. A solution to the said problem was to be provided by thin filters which were accommodated transversely to the main flow direction of the generated gas in the combustion chamber and which divide the combustion chamber into two partial chambers. However, here also there is a need for improvement, because in particular in combustion chambers which are filled with a large quantity of propellant, combustion chamber pressures which were too high were reached in the central region between the igniter unit and the outflow end of the combustion chamber. In this region, it is supposed that there occurs a particularly unfavorable configuration of extremely high flow speed of the generated hot gas and a high mechanical stress of the solid propellant, which is not yet fully burnt, as a result of being acted upon by hot particles. Mechanical damage (burning through) of the components (e.g. of the filter) can occur. Furthermore, the combustion chamber pressures may be too high and non-reproducible. A further disadvantage is the destruction of the solid propellant tablets, which are not yet burnt, through the high flow speed and the particles.

BRIEF SUMMARY OF THE INVENTION

The invention provides a gas generator in which the above-mentioned disadvantages are avoided. This is achieved in a gas generator which comprises a housing, a filter chamber, and a combustion chamber which is filled with solid propellant and which has an outflow end. The gas generator further comprises at least one igniter unit which has an igniter and ignites the solid propellant, and comprises at least one filter which adjoins the solid propellant at the outflow end and delimits the combustion chamber. The filter has a central part which at least in sections has the shape of a cone and tapers in a direction towards an interior of the combustion chamber. The solid propellant laterally adjoins the conical section. By means of the conical, preferably cone-shaped central part, which brings about a central recess in the combustion chamber, the quantity of solid propellant in the region of the center of the combustion chamber, where the above-mentioned unfavorable configuration of high flow speed and high stress occurs owing to the particles, is reduced. The generated hot gas can flow out earlier from the combustion chamber via the conical filter and can laterally flow through the filter as it immediately laterally adjoins the conical section. A better reproducibility of the combustion chamber pressures results, as tests have shown. In addition, the filter is no longer damaged by the hot particles. Owing to the conically tapering central part, the filter has a larger contact surface area for the particles than, for example, a disc-shaped filter arranged in a cylindrical combustion chamber. The contact surface area is quite clearly in a ratio to the length of the combustion chamber (the length is related to the main flow direction). If the combustion chamber is very long, then the contact surface area of the filter must be larger than in the case of a very short combustion chamber, so that the above-mentioned disadvantages can be avoided. Hence, with a short combustion chamber, the filter delimiting the combustion chamber preferably has a cone with a smaller height than with a longer combustion chamber, in which the recess formed by the filter is to project deeper into the combustion chamber.

The filter with conical central part is suitable in particular for a tubular gas generator with cylindrical combustion chamber, because here particularly long flow paths occur.

The filter can have a central part in the shape of a truncated cone, a cylindrical section being provided which adjoins the central part in the direction towards the interior of the combustion chamber, so that as a whole a long filter is produced, providing the combustion chamber with a deep indentation.

The filter is preferably manufactured from a plurality of layers, e.g. from a plurality of layers of a metal screen or of an expanded metal.

Preferably, downstream of the combustion chamber a filter chamber is arranged, which has a wall provided with throughflow openings. Upstream of this wall, the filter is provided which spaces the combustion chamber from the filter wall. Between this filter and the wall of the combustion chamber, an expansion chamber for hot gas can be formed.

According to a preferred embodiment, at least one gas-permeable intermediate wall is arranged in the combustion chamber, the intermediate wall dividing the combustion chamber into at least two partial chambers which are filled with propellant. These partial chambers are open towards the igniter unit, the partial chambers each comprising an open end so that the propellant contained in the two partial chambers is ignited via the open ends. The intermediate wall is therefore at least largely not present towards the igniter unit, preferably is even omitted entirely, so that the propellant in the two partial chambers can be ignited in parallel in terms of time. Through the provision of this intermediate wall, the active contact surface area is once again increased. The use of the additional intermediate wall is advantageous in particular in combustion chambers which have a long flow path. The intermediate wall can establish a flow channel within the combustion chamber and at the same time can make available a surface against which particles can accumulate. Thereby, the conical screen is relieved.

The intermediate wall reduces the pressure in the combustion chamber, occurring through the hot gas, and prevents a destruction of the solid propellant tablets. The igniting of the propellant as a whole becomes more reproducible. The gas generator according to the invention, constructed in such a manner, provides for a rapid pressure rise in the connected consuming device, despite a reduction of the pressure in the combustion chamber.

The simultaneous igniting of the propellant in the two chambers can be facilitated in that the two partial chambers towards the igniter unit continue into a common connecting section, filled with propellant, of the combustion chamber. Firstly, the propellant is burned in the connecting section by the igniter unit. Then the propellant ignites in each partial chamber.

For this, the intermediate wall ends in front of the connecting chamber.

In order to reduce the stress of the intermediate wall by the hot particles, the intermediate wall is preferably arranged substantially parallel to the main flow direction within the combustion chamber. The main flow direction is defined by the form of the combustion chamber and in particular by the arrangement of the igniter unit and through-flow openings in the wall which closes off the filter chamber towards the combustion chamber.

A simple manufacture of the conical filter together with the intermediate wall and a simple assembly can be achieved in that the conical filter and the intermediate wall are fastened to each other.

The gas generator according to the invention, as already mentioned, is preferably a tubular gas generator with an elongated cylindrical housing. Here, the igniter unit is arranged at an axial end and the combustion chamber and the filter chamber are arranged axially one behind the other. The cone of the filter is arranged coaxially to the housing, therefore extends into the center of the combustion chamber. Preferably, the intermediate wall is also arranged coaxially to to the housing, i.e. parallel to the main flow direction, which runs axially.

DETAILED DESCRIPTION OF THE PREFERRED EMBODIMENTS

Figure 1:
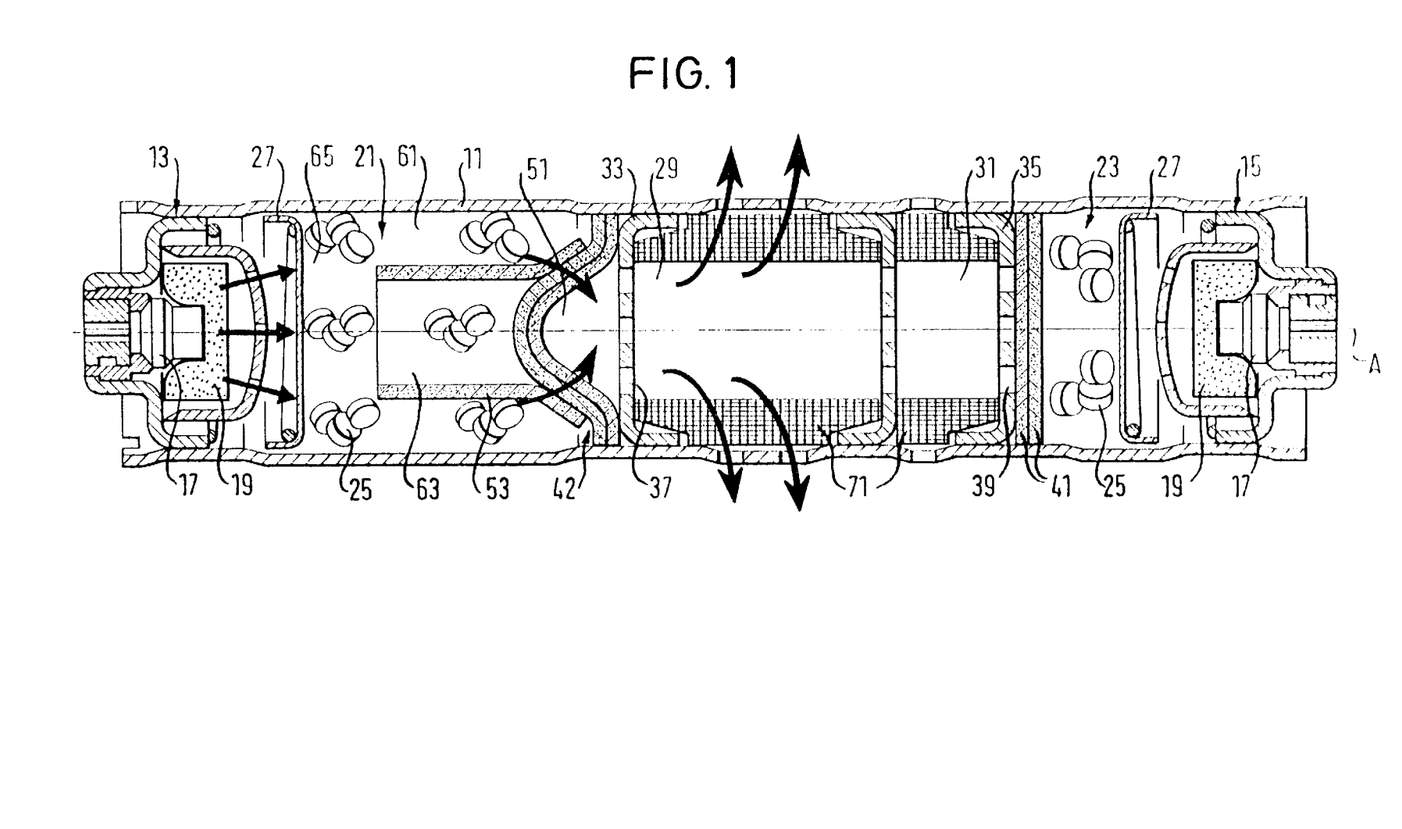
FIG. 1 shows a longitudinal sectional view through an embodiment of the tubular gas generator according to the invention, which is constructed in two stages.

In FIG. 1 a tubular gas generator is shown with an elongated cylindrical housing 11, in which at its axial ends a first igniter unit 13 and a second igniter unit 15, respectively, are arranged. The igniter units 13, 15 each consist of an igniter 17 and of an amplifier charge 19 adjoining thereto. Adjoining the igniter units 13, 15 are a first combustion chamber 21 and a second combustion chamber 23, respectively. Both chambers are filled with solid propellant 25 in tablet form. An elastically set disc 27, provided with large openings, in each combustion chamber 21, 23 serves to fix the tablets in position. Between the two combustion chambers 21, 23, two filter chambers 29, 31 are arranged, the filter chamber 29 being associated with the combustion chamber 21 and the filter chamber 31 being associated with the combustion chamber 23. Walls 33 and 35 close off the filter chambers 29 and 31 to the combustion chamber 21 and 23, respectively. The walls 33, 35 have through-flow openings 37, 39.

The combustion chamber 23 is delimited towards the wall 35 by two disc-shaped filters 41. These filters are flat. The combustion chamber 21 is delimited towards the wall 33 by a multi-layered filter 42, which is illustrated in enlarged form in FIG. 5. The filter 42 has a radially outer flat covering section 43 in the form of a circular ring, adjoining which is a tapered, more precisely cone-shaped, central section 45. The propellant 25 is arranged immediately adjacent to the cone-shaped section 45 and laterally contacts the filter in the cone-shaped section 45. The cone-shaped central section ends in a greatly rounded tip 47. Through the cone-shaped central section, the tip 47 of which lies on the central axis A of the tubular gas generator, the combustion chamber 21 is given a deep recess in the region of its outflow end (axial end towards the filter chamber 29). Thereby, less propellant is present in the region of the axis A. Downstream of the filter 42, between the latter and the wall 33, no propellant is present. In this region, an expansion chamber 51 is formed.

A cylindrical intermediate wall 53 is fastened to the cone-shaped filter 42, which intermediate wall 53 is likewise produced from filter material, e.g. from simple perforated sheet metal. The gas-permeable intermediate wall 53 has an extension 55 widening in a cone-shape (FIG. 5), with which it is fastened to the central part 45. The intermediate wall 53 is a slitted tubular body, the slit 57 being able to be seen in the top view. Thereby, a type of clamping effect of the intermediate wall on the cone-shaped central part 45 takes place.

The intermediate wall 53 is arranged coaxially to the housing 11 and divides the combustion chamber 21 into a radially outer, annular partial chamber 61 filled with propellant and a radially inner partial chamber 63, likewise filled with propellant. Both partial chambers 61, 63 continue into a common connecting section 65, likewise filled with propellant, which terminates the combustion chamber 21 towards the igniter unit 13. The two partial chambers 61, 63 are completely open towards the igniter unit and the connecting section 65.

The mode of operation of the gas generator according to the invention is explained hereinbelow. Depending on how much gas the restraint system requires which is connected to the gas generator, either the igniter unit 13 or the igniter unit 15 or both are activated. If the igniter unit 15 is activated, then the solid propellant is ignited in the combustion chamber 23. The hot gas flows through the filter 41 and arrives via the through-flow openings 39 into the filter chamber 31, from where it flows radially outwards through filter 71.

If the igniter unit 13 is actuated, then the propellant is ignited in the connecting chamber 65. Almost simultaneously, the propellant is then ignited in the partial chambers 61 and 63. The generated gas flows axially (main flow direction) through the partial chambers 61, 63 and in arrow direction through the filter 42 into the expansion chamber 51, from there via the through-flow openings 37 into the filter chamber 29 and outwards again. There are also flows of the hot gas between the partial chambers 61, 63. On burning of the propellant, slag in the form of hot particles is deposited on the intermediate wall 53 and on the filter 42. Through the intermediate wall 53 and the filter 42, a high filtering effect is achieved and the combustion chamber pressure is kept low. The burning of the propellant 25 is not delayed, however, by the intermediate wall 53 and the filter 42. Rather, a reproducible pressure distribution results and a reproducible gas outflow quantity over time.

Figure 2:
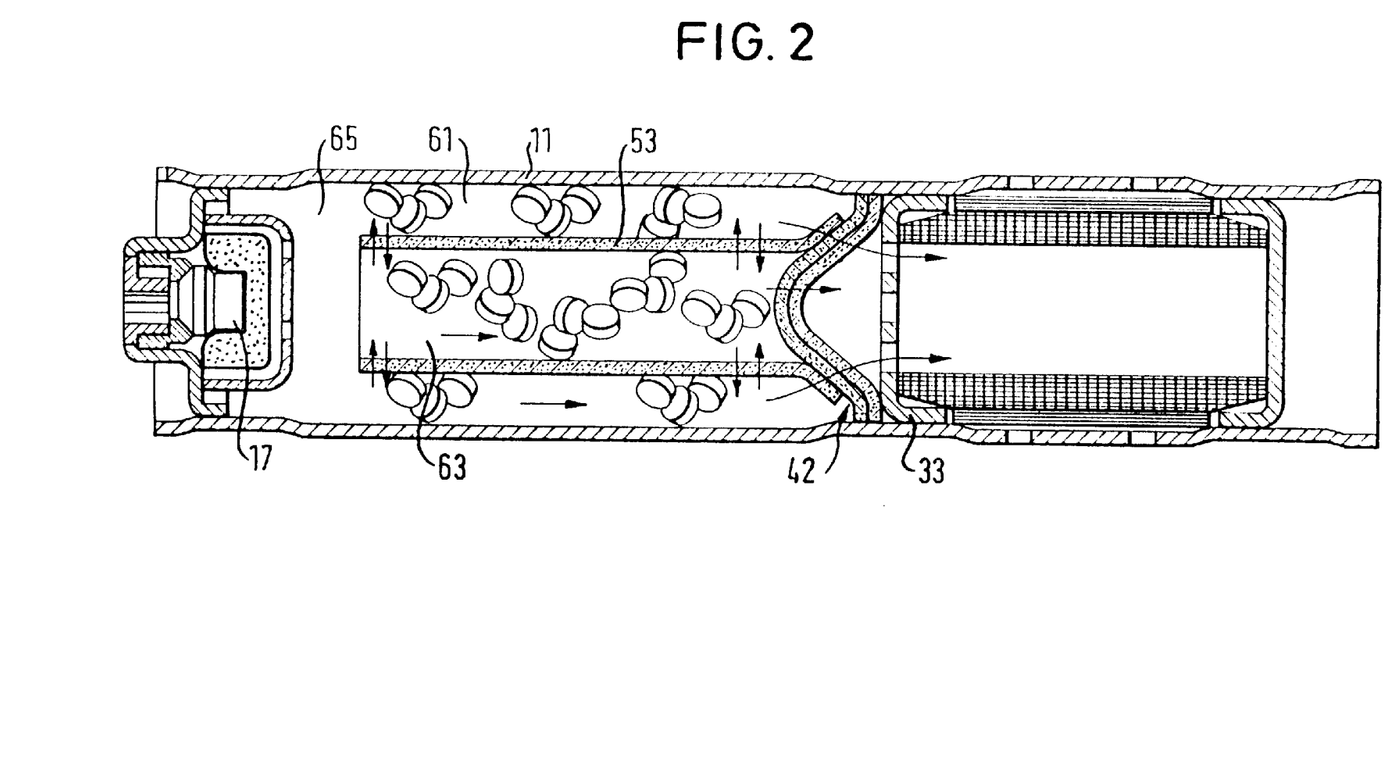
FIG. 2 shows a longitudinal sectional view through a single-stage tubular gas generator according to the invention.

The embodiment shown in FIG. 2 differs from that shown in FIG. 1 only in that the gas generator is constructed in one stage and the combustion chamber 21 is substantially longer than that shown in FIG. 1. So that in this embodiment the combustion chamber pressure does not become too high, the intermediate wall 53 is distinctly longer than in the embodiment illustrated in FIG. 1. From the comparison of FIGS. 1 and 2, it can therefore be seen that with a greater volume of the combustion chamber, in particular with a greater length of the combustion chamber, a greater filter area and a longer intermediate wall 53 are provided.

Figure 3:
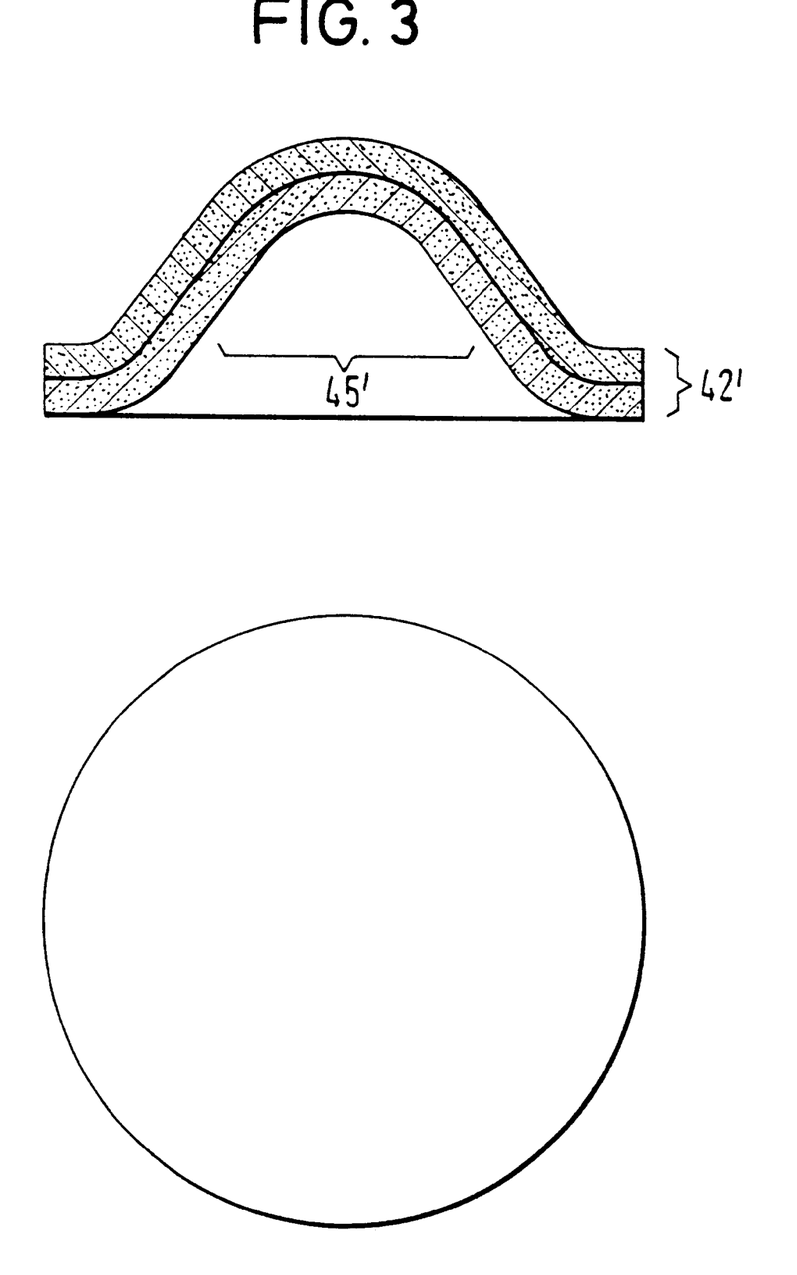
FIG. 3 shows a longitudinal sectional view and a top view onto an embodiment of the cone-shaped filter.

When the combustion chamber is constructed so as to be relatively short in the main flow direction, a cylindrical intermediate wall does not need to be provided automatically, under certain circumstances only the use of a filter 42' is sufficient, as is illustrated in FIG. 3.

Figure 4:
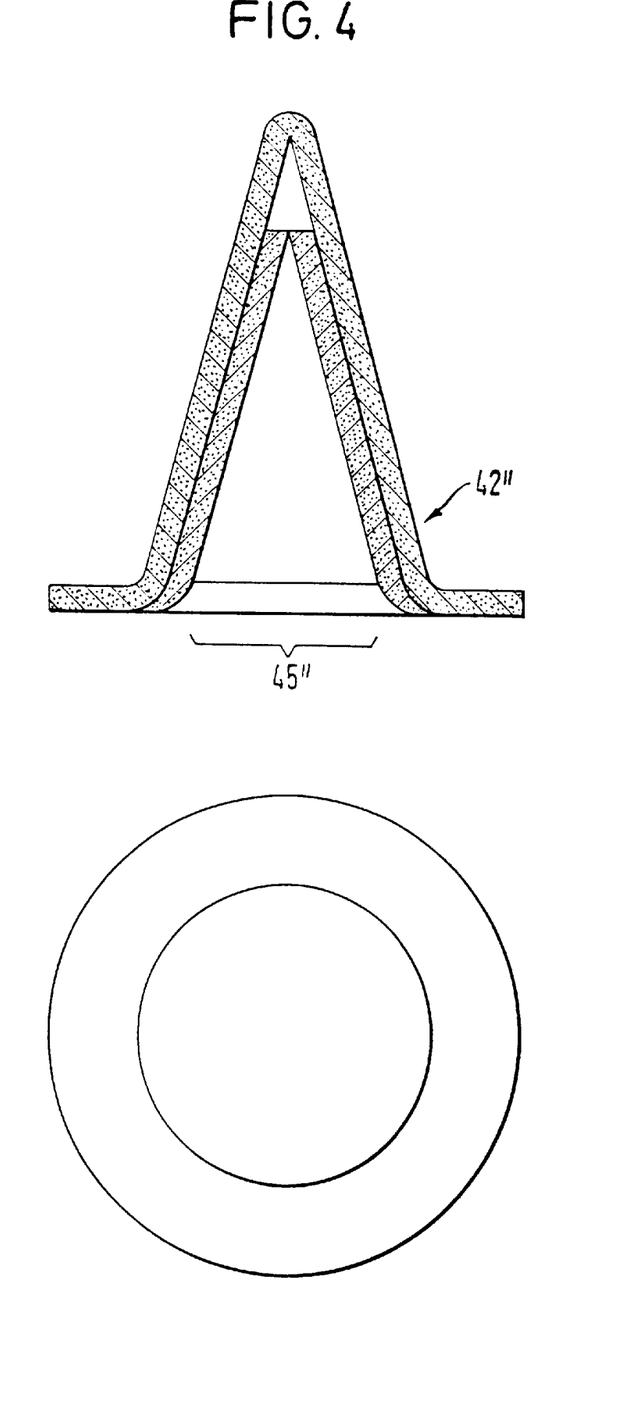
FIG. 4 shows a longitudinal sectional view and a top view onto a further embodiment of the cone-shaped filter.

If the combustion chamber becomes somewhat longer, then the filter area can be achieved for example by a cone-shaped filter 42" which is illustrated in FIG. 4. This filter 42" is substantially higher and has a central part 45" which is conical, more precisely which tapers very strongly to a point in a conical shape. Thereby, a substantially deeper recess into the combustion chamber is produced.

Figure 5:
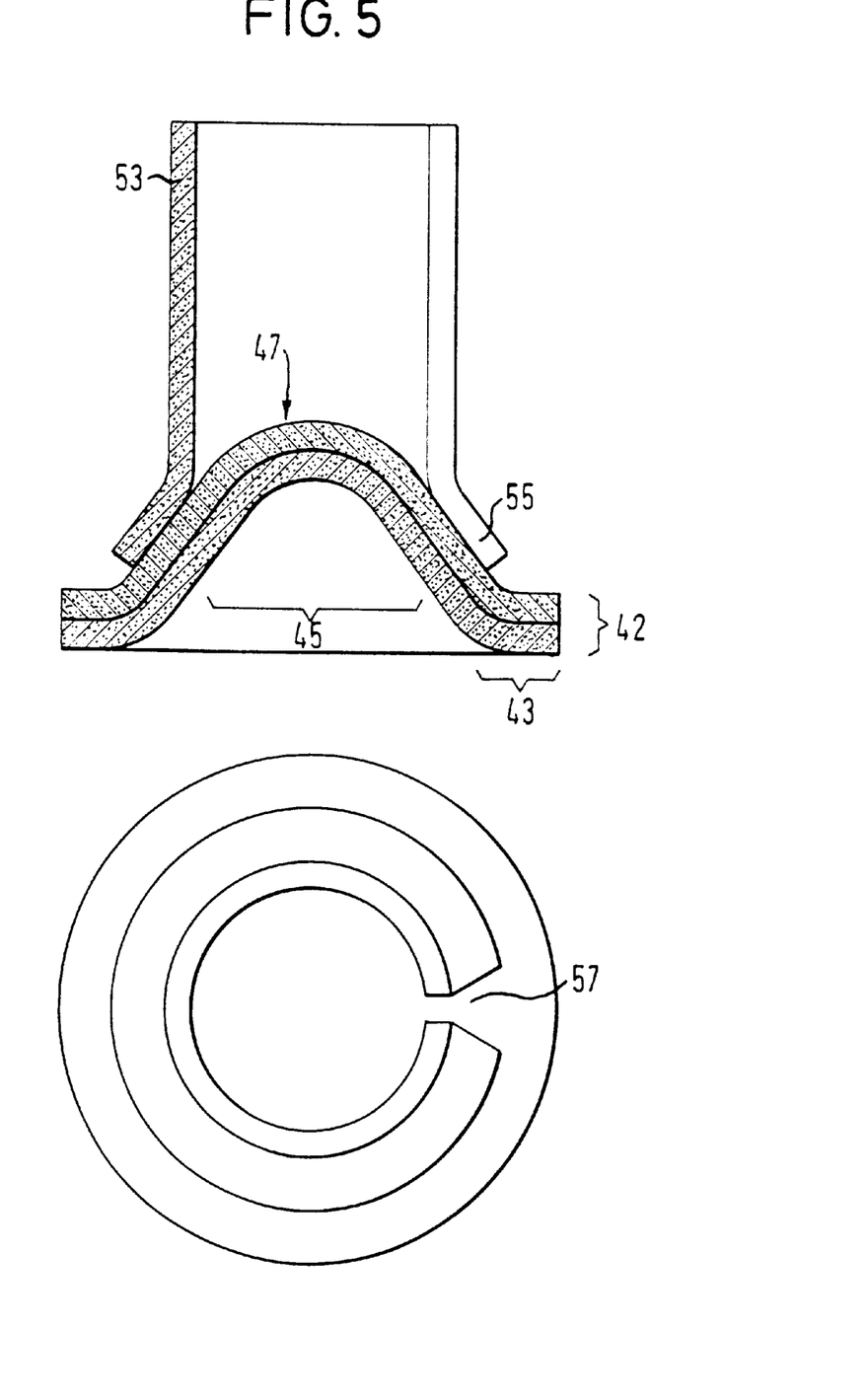
FIG. 5 shows a longitudinal sectional view and a top view onto an embodiment of the conical filter with intermediate wall arranged thereon.
Figure 6:
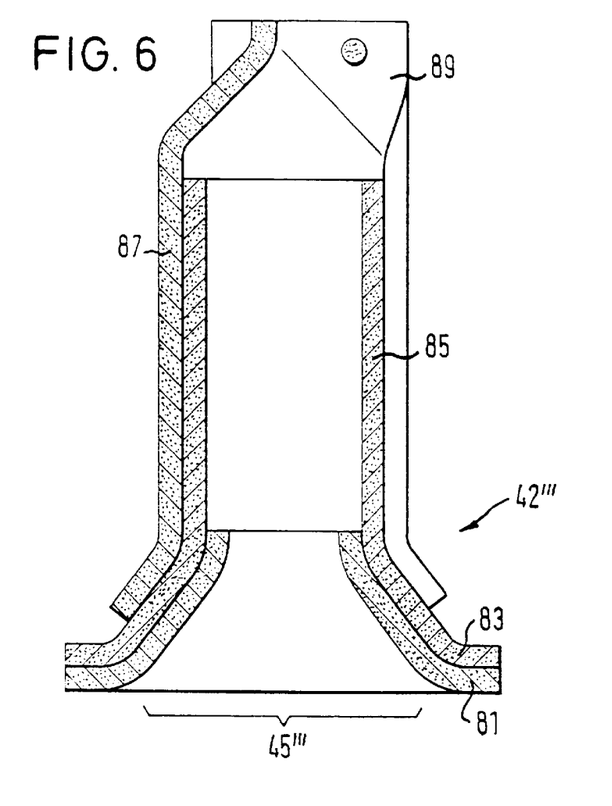
FIG. 6 shows a longitudinal sectional view and a top view onto a further embodiment of the cone-shaped filter with a long cylindrical section.

With an even longer combustion chamber, the arrangement illustrated in FIG. 5 of filter 42 with arranged intermediate wall 53 can be used. In addition, with very long combustion chambers also the embodiment of the filter 42''' illustrated in FIG. 6 is suitable. Here, the filter is composed from three layers. An inner layer 81 has a central part 45''' in the form of a truncated cone. A layer 83 adjoins the layer 81 radially towards the exterior, which layer 83 has a section in the form of a truncated cone and a cylindrical section 85 adjoining thereto. Radially outside the layer 83, a layer 87 is additionally provided, which projects beyond the free end of the cylindrical section 85 and in this region is pressed together against wall sections 89 and spot-welded. Thereby, the interior of the filter 42''' is closed towards the combustion chamber. In this case, "closed" of course means that hot gas can flow through the filter. However, no arrangement as in FIG. 5 is present, where the intermediate wall 53 is completely open towards the combustion chamber. In the embodiment shown in FIG. 6, also no propellant is to be arranged inside the filter 42'''.

It is to be stressed that the above-mentioned advantages are also only to be achieved by means of the cylindrical intermediate wall 53, so that if necessary the conical filter 42 can be omitted or replaced by a filter disc.

What is claimed is:

1. A gas generator, for a vehicle occupant restraint system, said gas generator comprising:
   a housing,
   a filter chamber,
   a combustion chamber filled with solid propellant and having an outflow end,
   at least one igniter unit having an igniter, and igniting said solid propellant, said solid propellant, when ignited, generating gas and filterable particles, and
   at least one gas permeable filter for trapping said filterable particles while allowing flow through of said generated gas, said at least one filter adjoining said solid propellant at said outflow end and delimiting said combustion chamber,
   said filter having a gas permeable central part in the shape of a truncated cone tapering in a direction towards an interior of said combustion chamber, said solid propellant laterally adjoining said central part, and said filter having a hollow and tubular cylindrical section which adjoins said central part in said direction towards said interior of said combustion chamber.

2. The gas generator according to claim 1, wherein the whole of said central part of said filter has said shape of a cone.

3. The gas generator according to claim 1, wherein said filter comprises wall sections and an end of said cylindrical section projecting in said direction towards said interior of said combustion chamber is closed by compressing said wall sections.

4. The gas generator according to claim 1, wherein said filter consists of a plurality of layers.

5. The gas generator according to claim 1, wherein said gas generator is constructed in a tubular shape having an elongated cylindrical housing, in which said combustion chamber and said filter chamber are arranged axially one behind the other, and wherein said conical section of said filter is arranged coaxially in said housing.

6. The gas generator according to claim 1, wherein a filter chamber is located downstream of said combustion chamber, said filter chamber having a wall with flow-through openings, said at least one filter being located upstream of said wall of said filter chamber, said at least one filter spacing said combustion chamber from said filter chamber.

7. The gas generator according to claim 6, wherein said filter closes off said combustion chamber towards said filter chamber and an expansion chamber is formed between said filter and said wall of said filter chamber.

8. A gas generator, for a vehicle occupant restraint system, said gas generator comprising:
   a housing,
   a filter chamber,
   a combustion chamber filled with solid propellant and having an outflow end,
   at least one igniter unit having an igniter, and igniting said solid propellant, said solid propellant, when ignited, generating gas and filterable particles, and
   at least one gas permeable filter for trapping said filterable particles while allowing flow through of said generated gas, said at least one filter adjoining said solid propellant at said outflow end and delimiting said combustion chamber,
   said filter having a gas permeable central part having at least in sections the shape of a cone tapering in a direction towards an interior of said combustion chamber, said solid propellant laterally adjoining said central part,
   at least one intermediate wall which is gas permeable over its entire extension being arranged in said combustion chamber, said intermediate wall dividing said combustion chamber into at least two partial chambers which are filled with propellant and open towards said igniter unit, and said partial chambers each comprising an open end so that said propellant contained in said two partial chambers is ignited via said open ends.

9. The gas generator according to claim 8, wherein said combustion chamber has a connecting section filled with propellant, said connecting section lying between said igniter unit and said partial chambers and continuing into said partial chambers.

10. The gas generator according to claim 9, wherein said intermediate wall ends in front of said connecting section.

11. The gas generator according to claim 8, wherein said filter chamber is arranged downstream of said combustion chamber, a wall being provided which has through-flow openings and separates said combustion chamber and said filter chamber from each other, wherein by an arrangement of said igniter and said through-flow openings and also a geometry of said combustion chamber a main flow direction is defined for generated hot gas, and wherein said intermediate wall extends substantially parallel to said main flow direction.

12. The gas generator according to claim 8, wherein said filter and said intermediate wall are fastened to each other.

13. The gas generator according to claim 8, wherein said gas generator is a tubular gas generator with an elongated cylindrical housing, said igniter unit being arranged at an axial end of said housing and said intermediate wall being arranged coaxially to said housing, and said combustion chamber and said filter chamber are arranged axially one behind the other.

* * * * *